Oct. 25, 1932.    C. M. ANGELL    1,884,502
MEANS FOR PASTING BATTERY PLATES
Filed Dec. 30, 1927    5 Sheets-Sheet 3
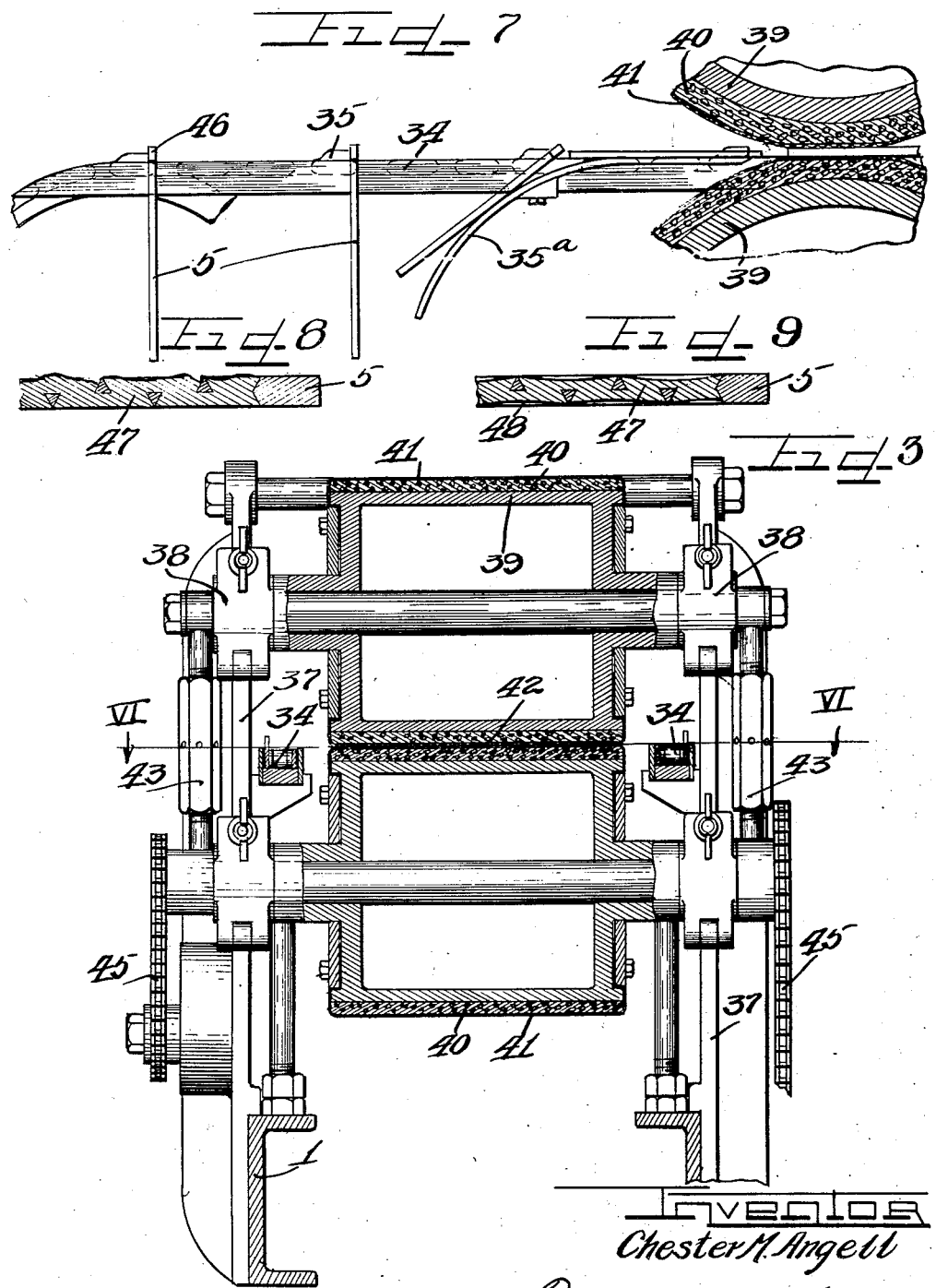

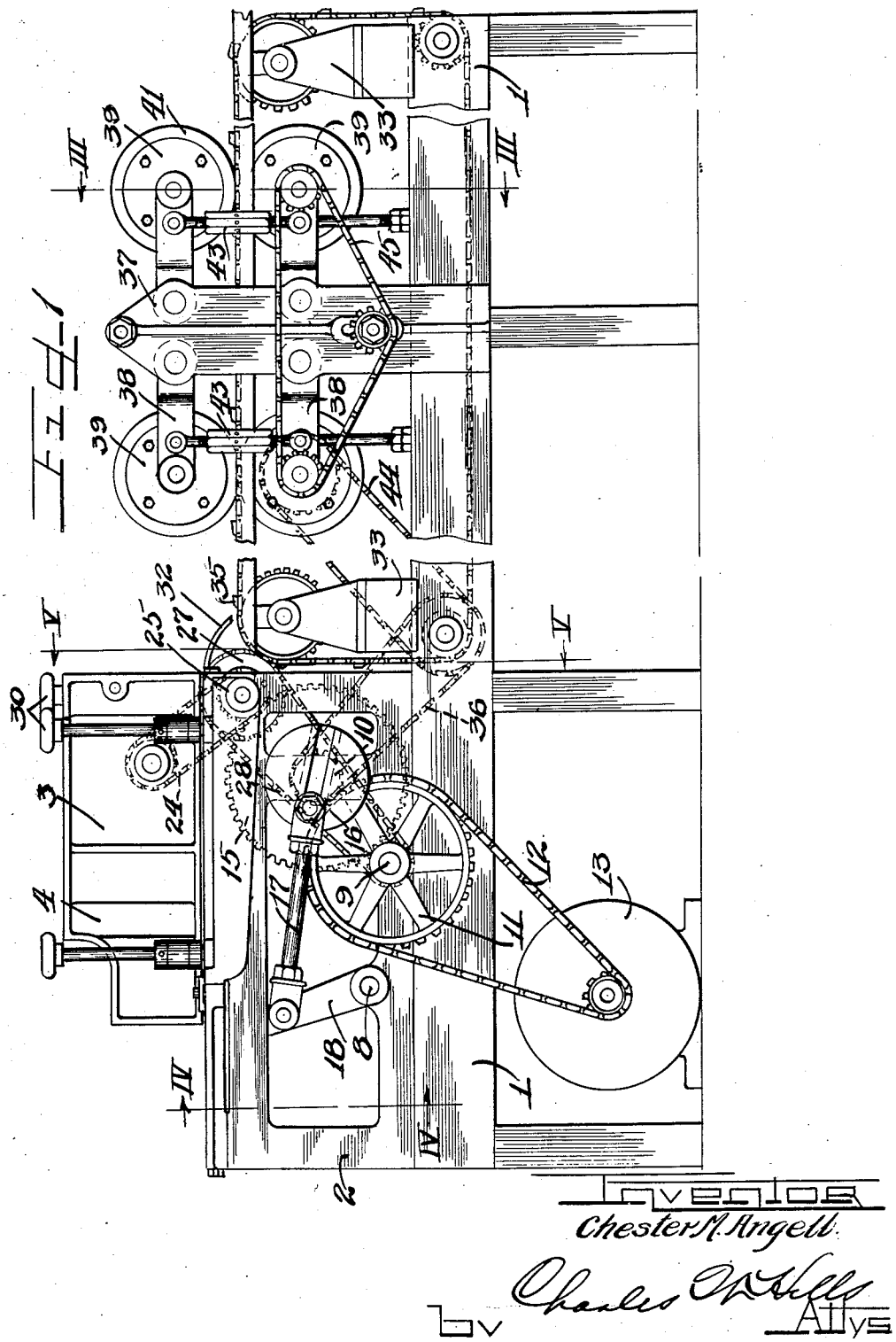

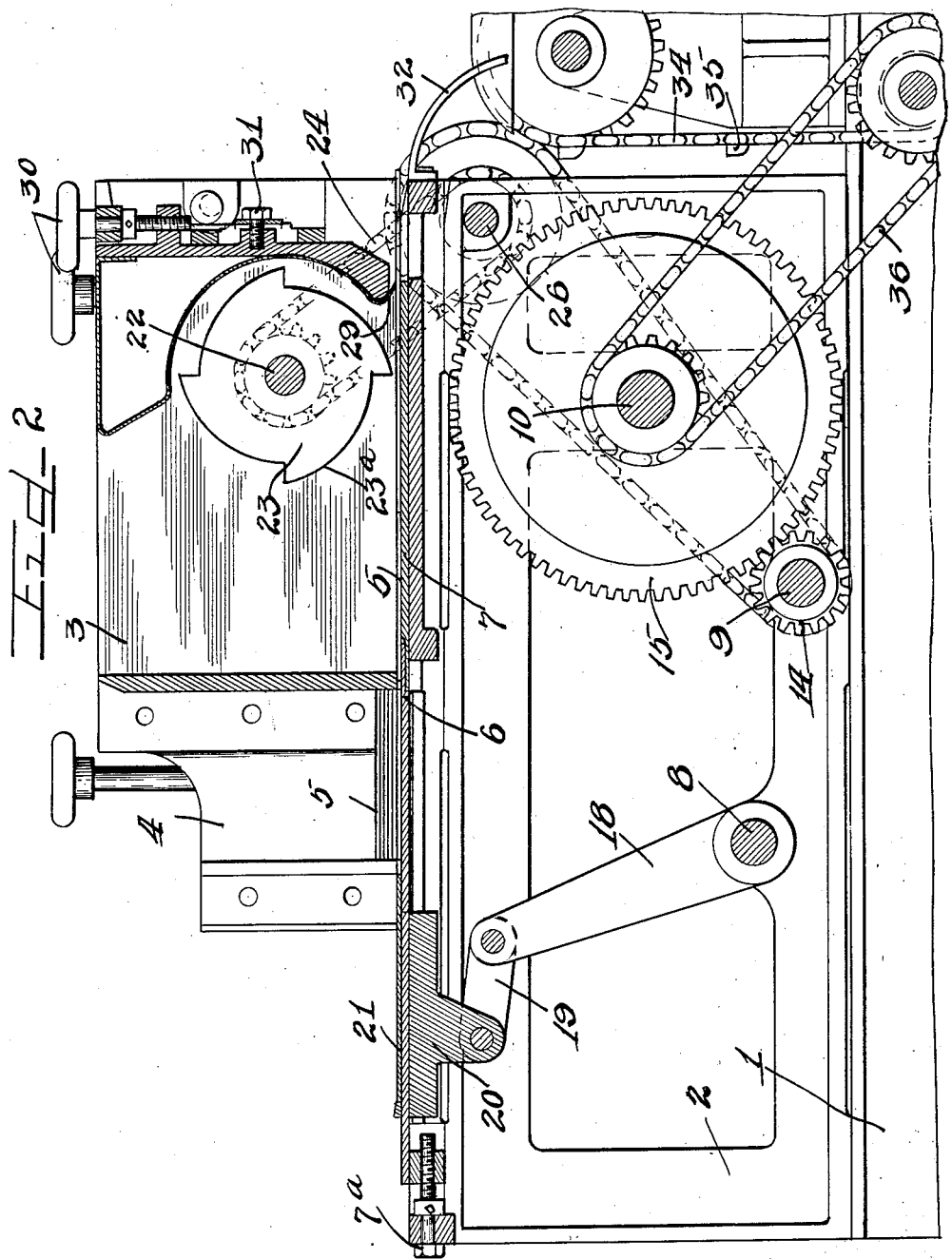

Oct. 25, 1932.  C. M. ANGELL  1,884,502
MEANS FOR PASTING BATTERY PLATES
Filed Dec. 30, 1927  5 Sheets-Sheet 4
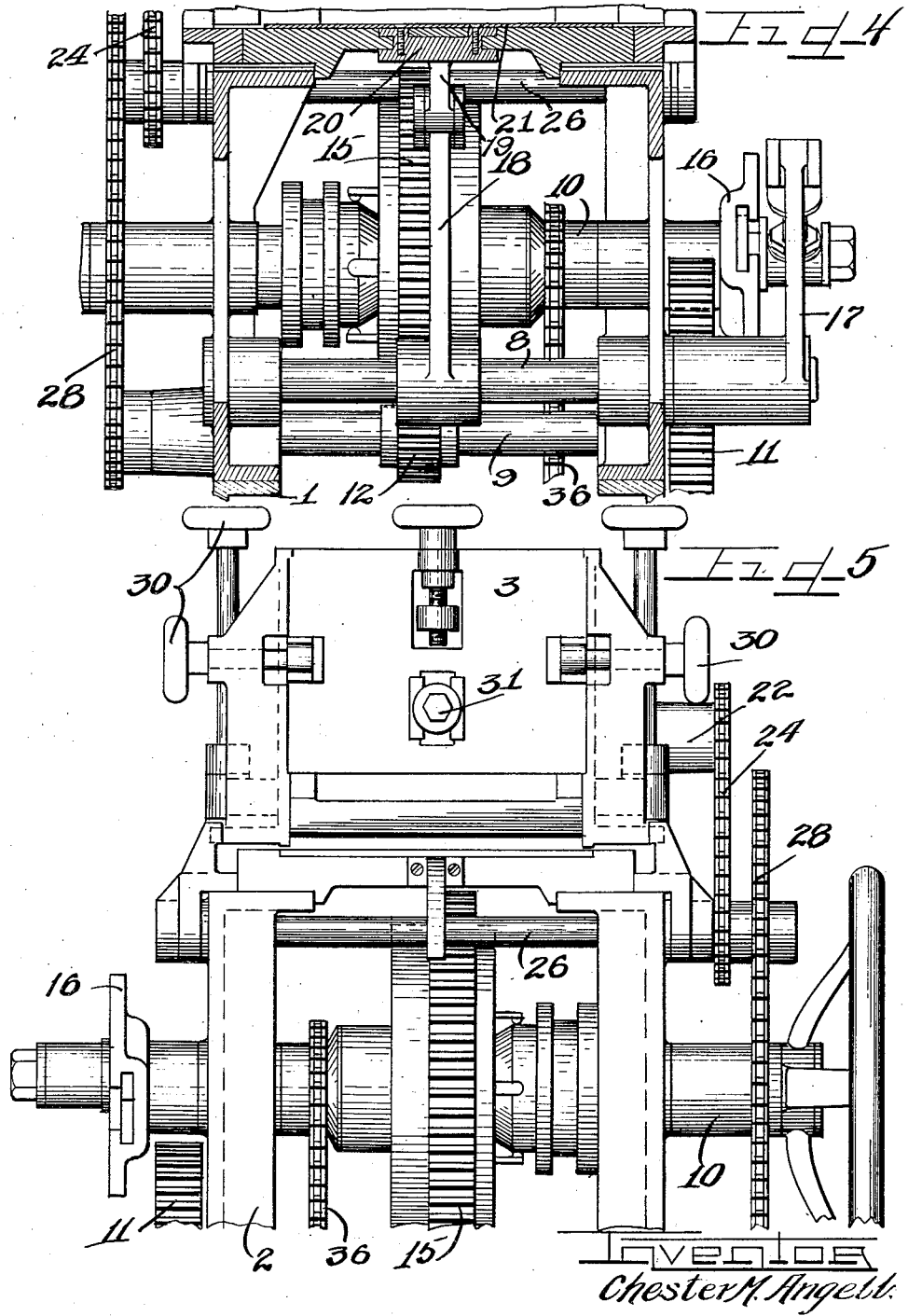
Inventor
Chester M. Angell
by Charles W. Hills
Attys.

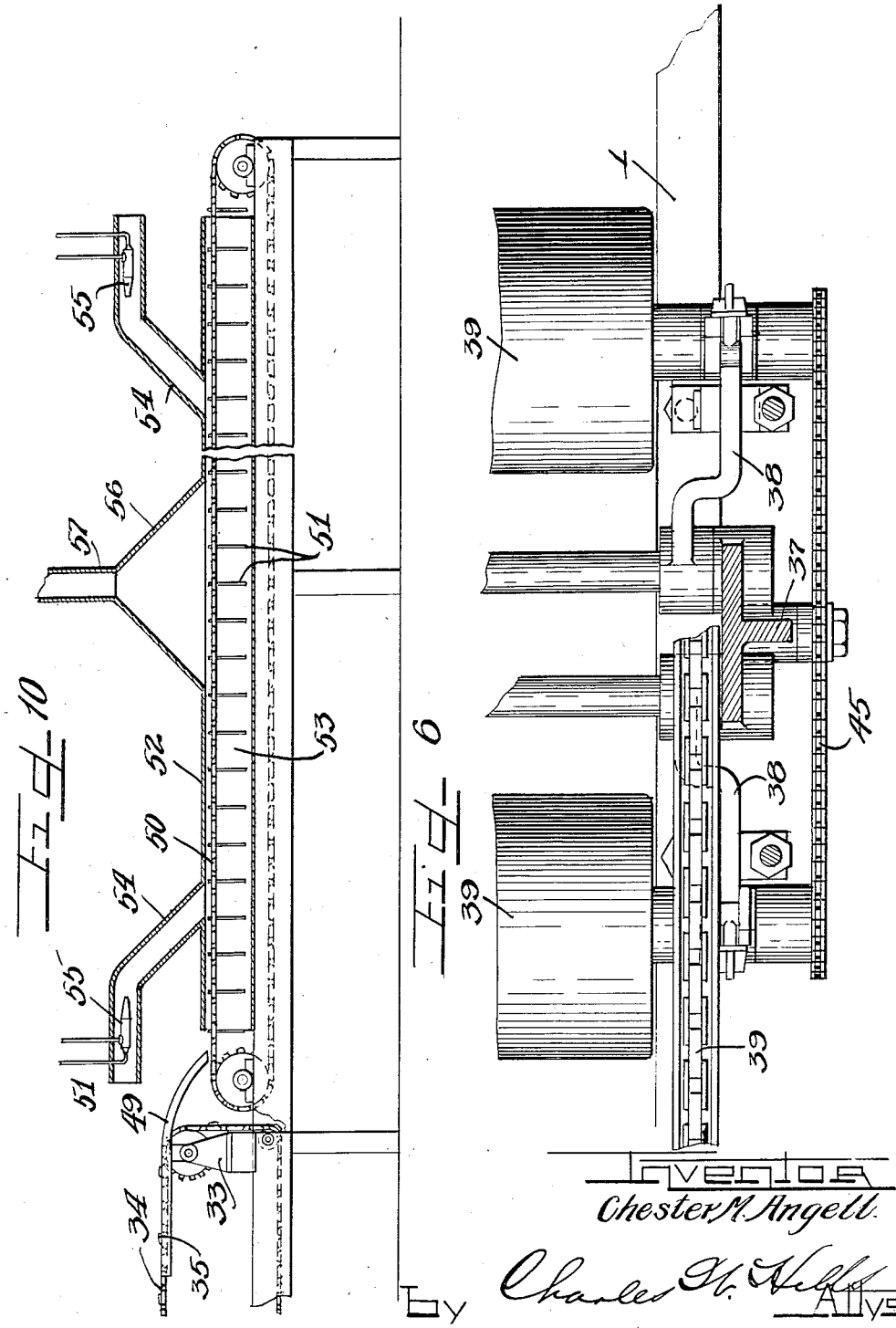

Patented Oct. 25, 1932

1,884,502

UNITED STATES PATENT OFFICE

CHESTER M. ANGELL, OF CHICAGO, ILLINOIS, ASSIGNOR TO VESTA BATTERY CORPORATION, OF CHICAGO, ILLINOIS, A CORPORATION OF ILLINOIS

MEANS FOR PASTING BATTERY PLATES

Application filed December 30, 1927. Serial No. 243,540.

This invention relates to improvements in a method and means for applying to battery plates the paste-like compound which forms one of the active components of a battery, and contemplates more particularly a battery plate pasting machine embodying a new method and principle of operation.

It is desirable in machines of this type that they be of high speed and possess positive driving mechanism and be of such construction that they require a minimum of attention. It is also desirable to apply to a battery plate or grid an amount of the paste compound substantially just sufficient to fill the grid, thereby affording a saving of material and tending to minimize labor. In addition, it is highly consistent with expediency to dry at least the surfaces of the pasted plates so that they may be stacked immediately upon leaving the machine, in superposed relationship one upon the other, with no inherent tendency to stick or adhere together, without previous resort to spaced stacking or artificial drying means.

Accordingly, therefore, it is an object of the present invention to provide a grid pasting machine of a high speed type, which embodies means for positively driving the same, and requires little attention.

Another object of the present invention is to provide a machine of the class described herein which applies just enough filling material or paste compound to a plate to properly fill the same, leaving very little or no excess paste thereon.

Still another object of the present invention is to provide means for kneading the paste into the voids and interstices of a grid.

A further object of the present invention is to provide means for kneading paste into a grid, leaving concave or arcuate surfaces on the paste between the cross ribs of the grid, whereby more paste surface is exposed for the battery fluids to act upon.

A still further object of the present invention is to provide a machine for pasting a grid and then drying at least the surfaces of the pasted grid if not the entire grid.

While some of the more salient features, characteristics, and advantages of a machine embodying this invention have been above pointed out, others will become apparent from the following disclosures.

The invention includes these and other features of construction and combinations of parts hereinafter described and shown in a preferred form in the drawings, as more particularly indicated by the claims.

In the drawings:

Figure 1 is a fragmentary side elevation of a machine emboding features of the present invention.

Figure 2 is a vertical sectional view through a portion (left half) of the machine shown in Figure 1.

Figure 3 is a fragmentary vertical sectional view taken substantially along line III—III of Figure 1.

Figure 4 is a fragmentary vertical sectional view taken substantially along line IV—IV of Figure 1.

Figure 5 is a fragmentary vertical sectional view taken substantially along line V—V of Figure 1.

Figure 6 is a fragmentary plan sectional view taken substantially along line VI—VI of Figure 3.

Figure 7 is an enlarged fragmentary view of a portion of the conveyor and rolls embodied in the present invention.

Figure 8 is a fragmentary sectional view of a battery plate or grid before kneading.

Figure 9 is a view similar to Figure 8, of a plate or grid after kneading.

Figure 10 is a fragmentary vertical sectional view of a portion of the present invention showing the same connected to the part shown in Figure 1.

As shown in the drawings:

In the illustrated embodiment of this invention there is shown a frame 1 upon a portion of which is mounted a super-structure 2 which supports a hopper or container 3 for the paste-like compound with which battery plates or grids are filled. Adjacent the paste hopper 3 is a guideway 4 in which grids 5 are stacked. The hopper 3 is open at the bottom thereof and a space substantially the thickness of one of the plates 5 is left between the lower edge of the wall common to the guideway 4 and hopper 3 and a runway 6 upon which the plates slide beneath the hopper. The portion 7 of the runway, disposed beneath the hopper is preferably formed of polished steel or other equivalent smooth material.

Means are provided for advancing the plates one at a time in horizontal alignment into and through the under part of the hopper 3, and include, in this instance, a plurality of shafts 8, 9, and 10, journaled in the superstructure 2. The shaft 9 or drive shaft is driven by a sprocket wheel 11 thereon and a chain 12 connected to a motor or equivalent driving means 13, which may be disposed in any desired position relative to the frame 1. On the shaft 9 there is mounted a relatively small gear 14 which meshes with a larger gear 15 on the shaft 10. Also on the shaft 10 is a slotted plate 16 to which one end of connecting rod 17 is adjustably connected, the other end of the connecting rod being pivoted to a rocker arm 18 on the shaft 8, which rocker arm is connected through a link 19 to a ram 20 having an upper plate 21 thereon substantially of the thickness of one of the grids 5. Obviously, therefore, at every revolution of the slotted disk 16, the ram 20 together with the plate 21 thereon will project one of the plates 5 into the lower portion of the hopper 3, as shown in Figure 2. This projected plate and others will be advanced through the hopper by end abutment of the next succeeding plate.

Within the hopper 3 on a shaft 22 are mounted one or more disc-like rotatable agitators 23 having arcuate or cam-like surfaces 23a thereon and which are driven by a chain 24 connected to a sprocket wheel 25 on a shaft 26 also journaled in the superstructure 2, which shaft 26 is connected in turn to a sprocket wheel 27 and chain 28 to the drive shaft 9. After a grid or plate 5 advances through the lower part of the hopper 3, it will be filled with the paste compound, the cam-like surfaces 23a exerting tangential pressure on the paste to urge it into the grid, and upon leaving the hopper, will pass underneath a resilient lip or trowel 29 secured to the lower portion of the rear hopper wall. This rawel tends to somewhat press the paste into the grid and to scrape off any excess paste. It is to be noted that, in this instance, the smooth runway plate 7 preferably terminates at a point just under the edge of the trowel 29, whereby the paste is prevented from passing entirely through a grid. The rear hopper wall including the trowel may be adjusted vertically by suitable actuation of a plurality of hand wheels 30 the adjustment being further secured by a stud 31. The amount of paste applied may be further varied by adjustment of the edge of the plate 7 through a screw adjustment member 7a, an excess of paste being applied when the plate 7 is moved rearwardly and a smaller amount being applied when the plate 7 is moved forwardly to a point in advance of the lip or scraper 29. This is due to the fact that the paste may pass through the grid when the plate 7 is moved rearwardly, an excess resulting.

Upon leaving the hopper 3 the grids 5 are projected down a chute 32 into means for kneading the paste into the voids and interstices of the grids. The means, in this instance, comprise a plurality of sprocket wheels mounted on shafts, the upper of which are journaled in uprights 33 mounted on a portion of the frame 1 adjacent the superstructure 2, and the lower of which are journaled in the frame 1. These wheels support a pair of parallel endless chains 34 provided at intervals with lugs or dogs 35 to engage a grid 5. The endless conveyor formed by the parallel chains 34, in this instance, is driven through suitable sprocket wheels and chain 36 by the shaft 10, connected to one of the shafts supporting the conveyor, but, of course, the chain 36 may be connected to any of the rotatable shafts journaled in the superstructure 2. Intermediate the uprights 33, uprights 37 are mounted to the frame 1 to which are pivoted a plurality of links 38. Journaled in the links 38 adjacent the outer extremities thereof, are a plurality of pairs of superposed rolls 39, which are, in this instance, covered by a soft porous material 40 (Figure 3) which in turn is covered by a layer of suitable fabric 41 such as cheese cloth, burlap, or the like. The lower rolls, in this instance, are preferably in contact with the rolls disposed immediately thereabove, as indicated at 42, although the spaces between the rolls and the pressure exerted by the rolls upon the objects passing therebetween may be adjusted by turn-buckle adjustments 43 connected to the pivoted links 38. The rolls, of course, are also preferably chain driven through the drive chain 44 and the roller chains 45 one of which is disposed on either side of the rolls. The peripheral speed of the rolls as so driven is slightly in excess of the speed of the plate conveying chains.

When the grids 5 leave the hopper 3 by way of the chute 32, they being supplied with just sufficient paste to properly fill the same, as previously described, they fall upon the conveyor chains 34 where they are carried along in an upright position as shown more clearly in Figure 7. The laterally extending lugs 46 customarily supplied on battery grids rest upon the chains 34 and are engaged by the dogs 35, the body or filled portion of the grid depending between the chains. A flat plate guide 35a brings the grids to tangential position as shown in Figure 7 so that they are fed between the rolls in substantially horizontal position, but in reversed position with respect to that in which they passed through the hopper 3. The paste carried by the grid will then be forced into the voids and interstices of the grid by the kneading action of the soft surfaced rolls. If any excess paste remains upon the grid after passing through the hopper 3, the excess will be very little and will, of course, be kneaded into the grid by the rolls.

In Figure 8 there is shown a portion of the grid 5 just prior to its entrance into the rolls. The grid is just filled with paste 47. In Figure 9, the grid is shown after kneading by the rolls, and it should be noted that the kneading action provides the paste with concave or arcuate surfaces 48 between the transverse ribs of the grid. More surface will thereby be exposed to battery fluids and consequently more energy will be derived from the plate.

Upon leaving the rolls the grids are projected by means of a chute 49 into the means for drying the grids, which means are operatively but removably connected with the kneading means. The drying means, in this instance, embodies an endless conveyor 50 similar to the conveyor formed by the chains 34, which may be driven by a chain 51 connected to a suitable sprocket wheel on one of the shafts supporting the chains 34. The conveyor 50 preferably runs at a slower speed than the conveyor 34 and receives the grids in upright position from the chute 49, the grids being in closer proximity to each other when traveling on the conveyor 50. Around a portion of the conveyor 50 a housing 52 is provided, defining a heating chamber 53. Adjacent each end of the heating chamber, sloping conduits 54 are provided each of which contains in the upper part thereof a burner, in this instance, a gas burner 55 of the Bunsen type. The burner 55 when ignited will cause hot blasts or currents of air to pass down the conduits 54 into each end of the heating chamber 53, thereby striking the grids 5 on each side thereof. The heated air passes out of the chamber through a hopper 56 and conduit 57 connected to the chamber 53 intermediate the conduits 54. The hot air blasts, of course, will dry at least the surfaces of the pasted grids if not the entirety thereof, and the grids may be immediately stacked in superposed relationship one upon the other after they leave the drier, with no danger of adjacent surfaces of the grids sticking or adhering to each other. In many instances it will be found desirable to immediately utilize the grids in batteries or the like, they being sufficiently dry for this purpose after emerging from the chamber 53.

The operation of the present invention is apparent from the foregoing, the grids being supplied, when passing through the hopper 3, with an amount of paste just sufficient to fill them, carried by the conveyor 34 through the rolls 39 wherein the paste is kneaded into the voids and interstices of the grids preferably leaving arcuate surfaces on the paste between the transverse ribs of the grids, and then carried by the conveyor 50 through the drying chamber 53, or through any suitable drying means such as additional rolls which may be heated, where they are sufficiently dried to permit immediate stacking thereof. Obviously, the grids will be wet when they reach the rolls, and the rolls, especially the first set, will express moisture from the paste, and after heating the pasted grid will have porous dried surfaces. It is to be noted in connection with the present invention that only a minimum amount of paste is used, and all scraping of excess paste from the edges of the grids, after leaving the rolls, is eliminated. It should also be noted that all of the elements of the machine are positively driven by chain driving means, whereby the machine may be operated at extremely high speed. In addition, the means for conveying the grids are unitary and individual to each of the major portions of the machine, whereby expeditious repairs are facilitated.

It will be apparent from the foregoing that the machine hereinabove described embodies a new and novel method of pasting and treating grids and the like, the method being set forth more fully in my copending application for Letters Patent for method of pasting and treating battery plates, Serial No. 311,705, filed October 10, 1928.

It is also apparent from the foregoing that the present invention although apparently embodying a considerable number of parts, is in reality, of relatively simple construction and assembly. Furthermore, the machine is easily operated, affords ready access to each and all the parts thereof, is extremely durable, and when operating, requires very little attention.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. In a machine of the class described, a paste hopper, a rotatable disc member in said hopper having cam surfaces thereon, and means for passing grids through the lower part of said hopper, whereby paste is applied to said grids and urged thereinto by pressure from said cam surfaces.

2. In a battery grid pasting machine, means for applying paste to a grid, means to limit the quantity of paste in the grid to an amount just sufficient to fill the grid, and convex rollers having the surfaces thereof in contact for kneading said paste into the interstices of said grid whereby said paste will have concave surfaces between the ribs of said grid.

3. In a battery grid pasting machine, means to apply paste to one side of a grid, and means to limit the quantity of paste in the grid to an amount just sufficient to fill the grid, said means including a plate positioned against said grid to prevent paste from passing entirely through said grid, and a wiper engaging the grid to press the paste into the grid against said plate.

In testimony whereof I have hereunto subscribed my name at Chicago, Cook County, Illinois.

CHESTER M. ANGELL.